REVERTIVE CALL-SELECTOR CIRCUIT

Filed Jan. 31, 1958 3 Sheets-Sheet 1

INVENTOR
J. E. COX
G. HASSER
BY
ATTORNEY

REVERTIVE CALL-SELECTOR CIRCUIT

INVENTOR
J. E. COX
G. HASSER
BY Albert Reis
ATTORNEY

REVERTIVE CALL-SELECTOR CIRCUIT

Filed Jan. 31, 1958 3 Sheets-Sheet 3

INVENTOR
J. E. COX
G. HASSER
BY [signature]
ATTORNEY

United States Patent Office 2,917,585

Patented Dec. 15, 1959

2,917,585

REVERTIVE CALL-SELECTOR CIRCUIT

John Edward Cox, Rutherford, and George Louis Hasser, Wayne, N.J., assignors to International Telephone and Telegraph Corporation, New York, N.Y., a corporation of Maryland Application January 31, 1958, Serial No. 712,377

10 Claims. (Cl. 179—17)

This invention relates to automatic telecommunication systems and, more particularly, to a revertive calling arrangement for use in automatic telephone systems.

Revertive calls are those which occur when a party-line telephone subscriber dials another subscriber station connected to the same party line and, since a ringing circuit can be completed only when all handsets on the line are replaced and their corresponding hookswitches are open, it is necessary for the calling subscriber to replace his handset after the completion of dialling. The exchange equipment must test that line for idleness and then apply the appropriate ringing current by any one of several methods well known to the art. The ringing is "tripped" when the called party answers the call. There have been several systems for achieving revertive calls but the prior art is based upon the fact that each party-line subscriber, in addition to his regular directory designation, is given a separate numerical designation which is dialled when he is to be called by anyone on his party line. This has its disadvantages, in that, party-line customers must be given additional cards containing all the special numerical designations of their co-line subscribers. This all entails extra expense. Since the planned advent of direct-distance dialling on a nation-wide scale, it is required that all subscribers be recognized by a "2—5" code. This means that there may be extra digits which must be dialled within the exchange, and, for stations on the same party line, there will be a plurality of the digits in such a code which must be absorbed. The invention contemplates a novel digit-absorbing circuit particularly adaptable for party-line calling, and contemplates the use of a special revertive call-selector which may be seized when a party-line station is being dialled from another station on the same party line.

In carrying out the practice of the present invention, the calling party-line subscriber transmits a special prefix digit or digits by the aid of a signalling mechanism, i.e., a dialling mechanism, followed by the regular directory number of the called subscriber. After dialling the special prefix digit or digits and then the digits of the regular directory number, the calling subscriber will receive a special tone and replace his handset on the cradle. The revertive-call circuit provided in accordance with our invention, will absorb the digits of a directory number which are unnecessary for intra-exchange calling, repeat to the succeeding switch train the digits constituting the balance of the directory number with the exception of the ultimate digit thereof, store the ultimate digit until the re-opening of the subscriber's loop upon the replacement by the calling subscriber of his handset in its cradle, after which the stored digit is pulsed out to the succeeding switch train to complete the connection.

The special revertive call-selector circuit which we have invented contains relatively few components, and a relatively few of these special revertive call-selector circuits may serve the entire exchange because one of the features of the operation of the inventive circuit resides in the fact that the special selector may be released after the connection is made and therefore will be made available to other calling party lines.

Accordingly, it is an object of the invention to provide a revertive call-selector circuit for use in a party-line system where each subscriber is given a normal directory designation. It is a further feature of the invention to absorb unnecessary dialled digits making up a portion of the directory designation of a co-party line station.

A still further object of our invention is to provide a means for withholding the last dialled digit of a called subscriber's numerical designation until the line is made idle, by the calling subscriber disconnecting, to complete the connection and to release the revertive call switch for re-use by another calling party-line subscriber.

According to one feature of our invention, therefore, a plurality of subscriber stations coupled to a common party line and having different directory numerical designations may, when calling each other, have access to the special revertive call-selector circuit which absorbs unnecessary dial digits and stores the last digit of a dialled number and includes means responsive to the replacement of the handset in the cradle by a calling subscriber for applying the stored digit to the normal switch train to complete the connection; whereupon, the connection is made and the special revertive call-selector circuit is released.

A yet further object of our invention is to provide a special revertive call selector circuit which is released for use by other calling subscribers upon the completion of a connection.

The above-mentioned and other objects and features of our invention will be clearly understood from a consideration of the following description of a preferred embodiment thereof taken in conjunction with the accompanying drawing, in which:

Fig. 1 is a block diagram of a portion of a party line, a connecting circuit and the inventive revertive call selector;

Fig. 2, consisting of Figs. 2A and 2B, is a detailed showing of the revertive call selector circuit of Fig. 1. Fig. 2B is to be placed to the right of Fig. 2A; and Fig. 3 is a diagrammatic representation of the post-spring cams which control digit absorption in the circuit of Fig. 2.

In the drawing, the convention universally adopted for indicating relay contacts detached from their respective relay coils has been employed for simplifying the tracing of the circuits. In this form of showing, a relay such as A, Fig. 2, is given a letter designation placed above a numeral, thus:

$$\frac{A}{2}$$

The numeral indicates the number of contact combinations associated with the relay A, each of these contact combinations being given a designation consisting of the same letter followed by a numeral, e.g., contacts *a1* and *a2* associated with relay A. The contacts associated with any particular relay can then be readily located on the drawing.

Referring now to Fig. 1, there is shown in block diagram a plurality of subscriber sub-stations T1, T2 connected to the common party-line L. At the exchange, the party-line L is connected to a contact in the bank of a line finder LF, and when a subscriber removes his handset from the cradle, the line finder proceeds to locate the calling line in a manner well known by those skilled in the art. The line finder couples the calling line to a first selector, and if the call is destined to a called party other than a party on the same party-line L, the call is progressively switched through a number of selectors to the *n*th selector. The number of selectors required depend upon the number of digits which must be dialled. The *n*th selector connects to the connector which completes the connection to the called party. According to the invention, however, in the event that a calling subscriber T1, for instance, desires to dial his co-party T2, he must first preface the directory designation of his co-party by dialling a special numerical designation which characterizes the service required. Upon receiving the special numerical designation, the first selector moves to a level to which is attached a special second selector. The special second selector is special only in the sense that it is assigned solely to special services such as revertive calls, calls to information, wire-chief, etc., as distinguished from call-forwarding services. There are a number of revertive call selectors (of which only one is shown) each connected to a different contact in a particular bank; the bank characterizing a revertive call. Thus, if one revertive call selector is busy, the special second selector will continue its rotary stepping until it finds an idle revertive call selector. Such selection is well known in the art and will not be further described. The revertive call selector which absorbs unnecessary digits, stores the last dialled digit, and after ascertaining that the calling party has replaced his handset on the cradle, releases the switch train before it (Line finder, 1st Selector and Special Services Selector) and automatically repeats the last digit to the switch train so that the connection may be completed through the connector, in a normal manner.

Fig. 2 shows the detailed circuitry of the special revertive call-selector circuit and will now be described.

*General description*

The revertive call-selector circuit is shown to have the three customary incoming leads, minus, plus and P, of which the first two are the talking leads and the P lead is the test lead. There is provided a line relay A which follows the dial pulsing from the subscriber's loop. The selector switch S is a Strowger switch and has three wipers W1, W2, W3 associated with contact banks CB1, CB2 and CB3, respectively, a vertical stepping magnet V, a rotary stepping magnet R and a release magnet Z. It should be understood that the invention is not limited to use in a system using Strowger switches, but may be adapted for use in a rotary, cross-bar, panel or any other type of switching system. There are also provided a pair of minor switches MS1 and MS2, having stepping magnets OM1 and OM2, respectively. Minor switch MS1 has a pair of contact banks MS11 and MS12 together with pairs of cooperating bridging wipers BW1 and BW2, respectively. Minor switch MS2 has a single contact bank MS21 with its cooperating bridging wipers BW3. These switches count the pulse trains which are to be transmitted over the selector switch S, forwardly into the switch train as shown in Fig. 1, as will be more fully explained later. The switch MS1 is provided with off-normal contacts CM11 and CM12. The switch MS2 is provided with off-normal contacts CM21 and CM22. The switch S is provided with two sets of post springs, PS1 and PS2, which are operated as the switch is raised to certain vertical levels in accordance with the contour of the cam surfaces shown in diagrammatic form in Fig. 3. The dialled pulses, representing digits which are to be absorbed, cause the vertical magnet V to successively raise the wiper assembly in response to such pulses but due to the cam surfaces shown in Fig. 3, upon the conclusion of the dialling of each of such digits, the release magnet Z is energized and the wiper assembly falls back to its original position.

A number of off-normal spring contacts NS1 . . . NS4 under control of the vertical upward movement of the wiper assembly of switch S are moved to positions opposite to that shown in Fig. 2. The rotary stepping movement of the wiper assembly of switch S is effected by the magnet R and contacts WR1 are rotary interrupter contacts. The balance of the circuitry will be described incident to the description of the operation thereof.

*Detailed description and operation*

Figure 1:
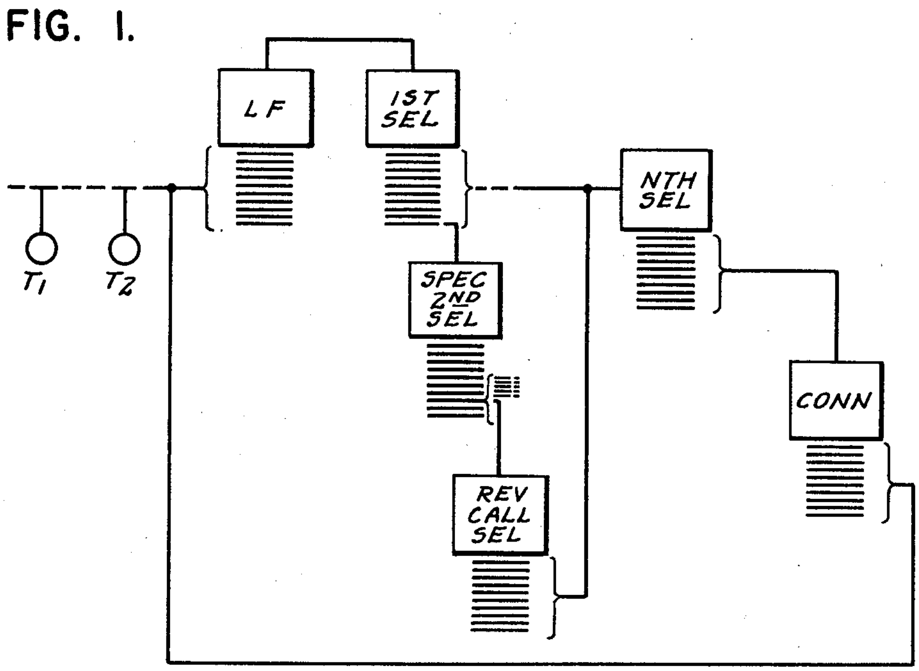

The detailed description will now be undertaken in connection with the tracing of a revertive party-line call dialled by one of the party-line subscribers. For the sake of exposition, it will be assumed that the subscriber number ORegon 3—5678 will be dialled. This exchange and number correspond to the digits 673—5678. The number is prefixed by suitable special digits beginning with the digit "1." As is well known, the digit "1" is reserved for special services, information, long-distance, etc., when followed by other allotted digits. In no case is the digit "1" used for the selection of an exchange connection. Assume that the special digits for the calling of any co-party line subscriber will be the digits: "1, 2, 3." The digit "1" will cause the calling subscriber to reach the special selector in Fig. 1 over a first selector and the other digits will cause connection to the special revertive call-selector circuit, shown in Fig. 2. Thus, it should be understood that for the conditions supposed, for the purposes of explaining the invention, the first three digits serve the purpose of routing the call to the special revertive call-selector circuit by known circuit techniques used for connecting a calling subscriber to a special service and we now proceed to a consideration of the operation of the circuit with respect to the digits representing the regular directory digital designation of the called subscriber.

Figure 2A:
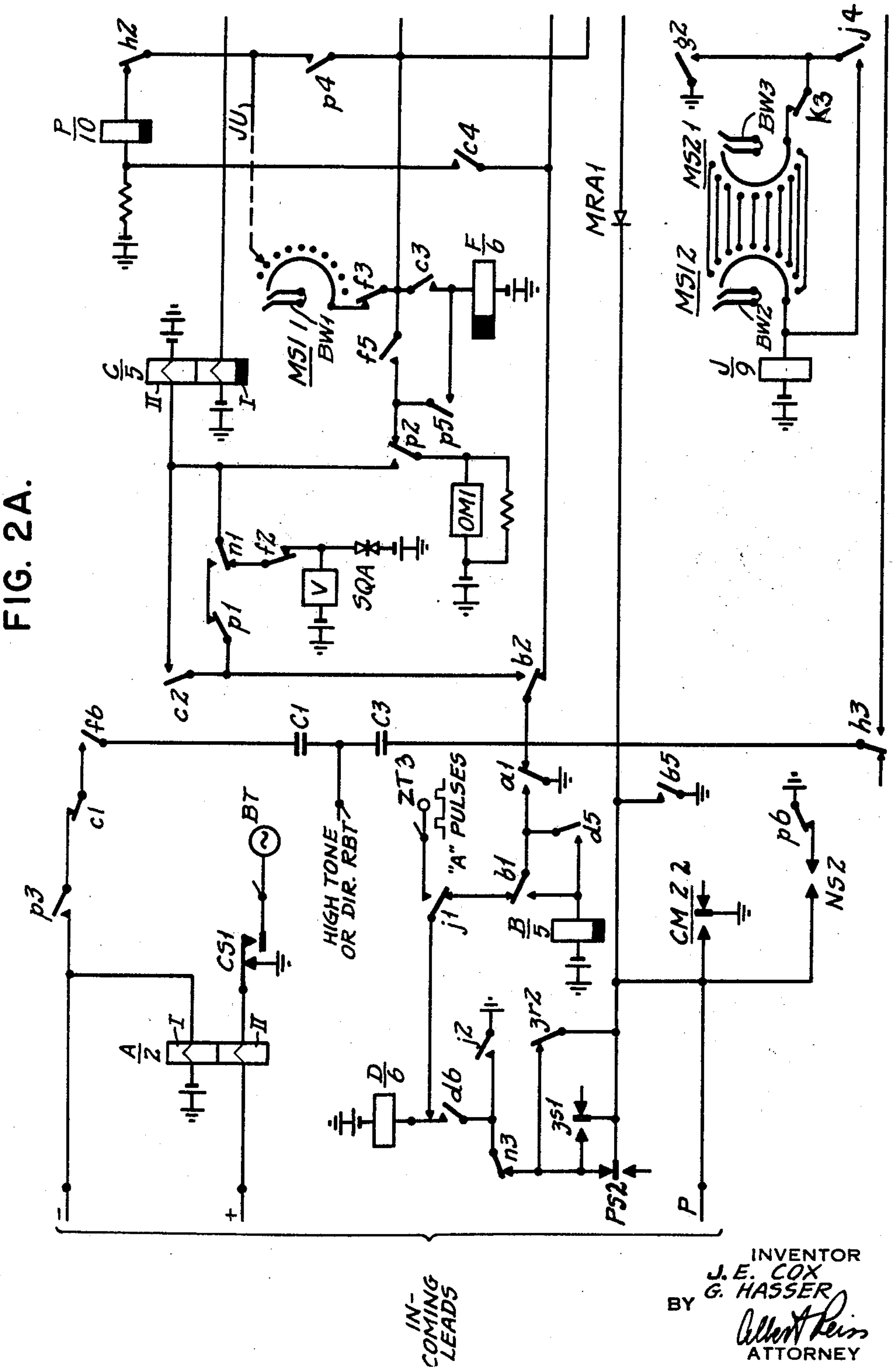
Figure 2B:
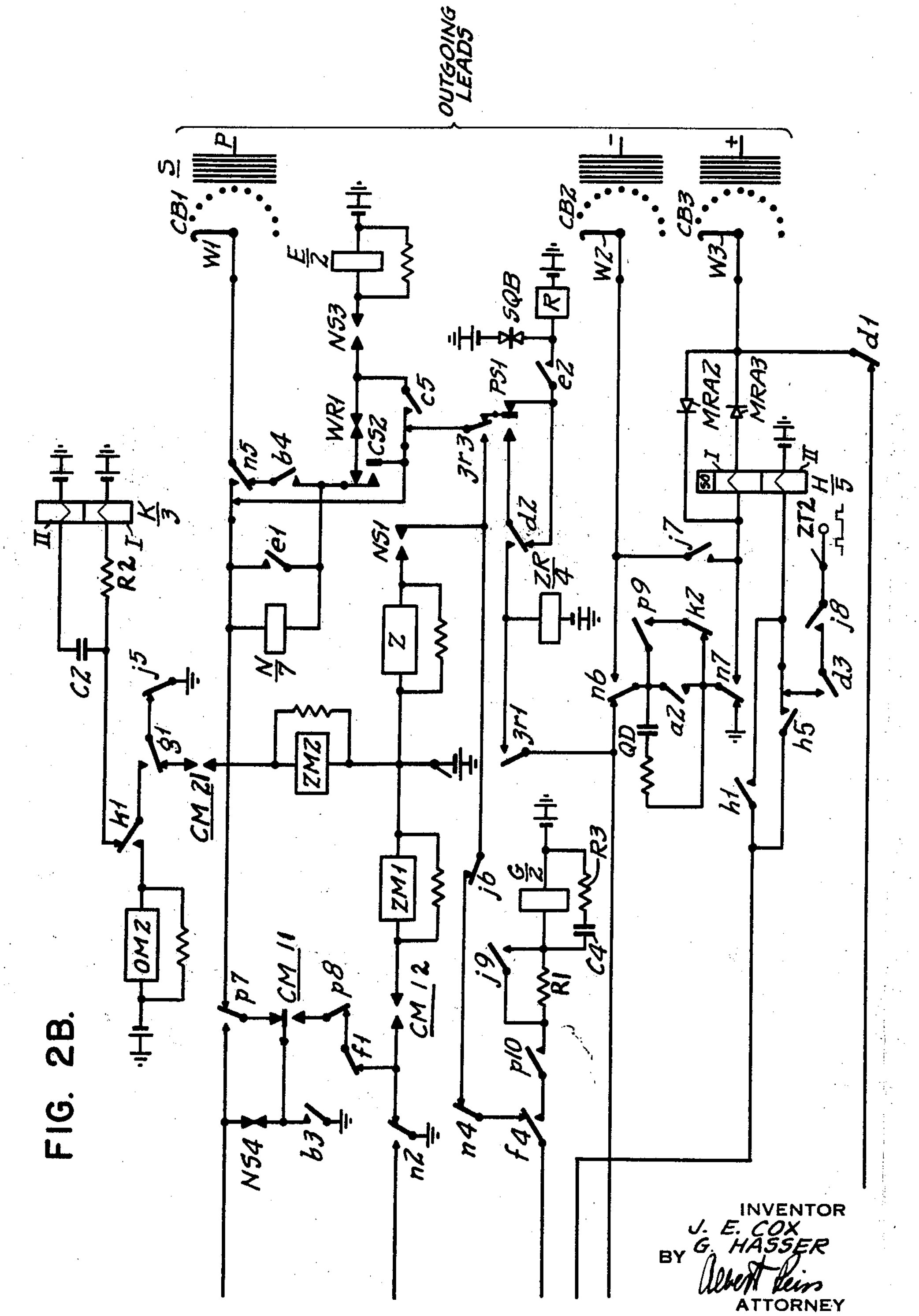

*Fourth digit dialled.*—In the sample number selected, viz., 113—673—5678, the fourth digit to be dialled will be a "6." When the circuit of Fig. 2 is seized, the line relay A is energized over the calling subscriber's loop. Relay A at its operated contact *a*1 completes a circuit for the operation of digit-absorbing relay D, via: normal contacts *b*1, *j*1, and make-before-break contact *d*6. The operation of relay D causes slow-release circuit-hold relay B to operate via: operated contact *a*1 and operated contact *d*5. The operation of relay B completes a first circuit for the operation of slow-release long-break relay C via: operated contact *b*3, closed off-normal springs NS4, and winding I of relay C. Relay B is a slow-release relay and remains up until dialling is completed, its holding circuit being over contacts *b*1 and *a*1. As previously stated, the off-normal spring NS1 . . . NS4 are controlled by the vertical movement of the wiper assembly and upon movement thereof from the lowermost position, contacts NS1 . . . NS3 are operated and normal contact NS4 will open. Relay D remains operated via: operated contact *d*6, normal contacts *n*3, PS2 and operated contact *b*5. The operation of relay C prepares a circuit for its other winding II via: operated contact *c*2, operated contact *b*2 and normal contact *a*1. A parallel preparatory circuit is closed by the contact *c*2 for the vertical magnet V via the normal contact *n*1 and normal contact *f*2. At each release of the relay A incident to the dialling of the digit "6," the vertical magnet V is pulsed. Thereupon, the springs NS1 . . . NS4 change position, as previously stated, but the relay C holds up due to the energization of its winding II and its slow-release characteristic. Since this first digit dialled is to be absorbed, the cam 6*c* shown in Fig. 3 causes the post springs PS1 to change their position. Incident to the vertical upward movement of the wiper assembly of switch S to the sixth level (corresponding to the dialled digit "6"), the contacts PS2 will be momentarily opened as the assembly passes the third level. This interruption has no effect however on the holding circuit for relay D which remains energized via the normal contacts *zr*2 which bridge contacts PS2. The movement of the post springs PS1 to their opposite position prepares a circuit for the operation of auxiliary digit-absorbing relay ZR via operated contact *d2*. At the conclusion of the first digit, relay C, after a short delay time, will release, and at normal contact *c5*, completes the circuit for the operation of auxiliary digit-absorbing relay ZR via: operated contact *d2*, post springs PS1, normal contacts *zr3*, *c5*, *n5*, *p7*, off-normal contact CM11 and operated contact *b3*. Relay ZR locks over its operated contact *zr1*, rectifier MRA1 and operated contact *b5*. The operation of relay ZR completes a circuit for the operation of the release magnet Z via: closed off-normal springs NS1, operated contact *zr3*, normal contacts *c5* and *n5*, normal contact *p7*, off-normal contacts CM11 and operated contact *b3*. The energization of release magnet Z causes the wiper assembly to fall back to its lowermost position. Thus, the first digit dialled has been absorbed.

*Fifth digit dialled.*—The fifth digit to be dialled will be "7." The relays D and B remain energized since the relay A is up during the inter-digital pause and the balance of the relays previously described in the preceding paragraph will again operate. Since the fifth digit is "7" and is to be absorbed, the cam *7c* in Fig. 3 will again cause the post springs PS1 to complete a circuit for the operation of auxiliary digit-absorbing relay ZR and again the wiper assembly falls upon operation of the Z release magnet.

Figure 3:
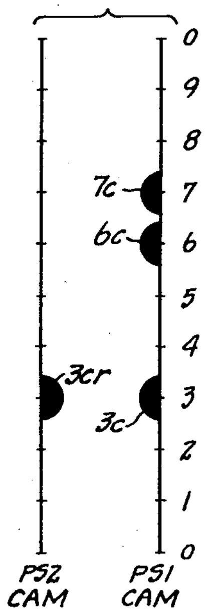

*Sixth digit dialled.*—The sixth digit dialled will be the digit "3" and this digit also is to be absorbed. Since the sixth digit is the last digit to be absorbed, the cam *3cr* shown in Fig. 3, is arranged so that the post-spring contacts PS2 are opened. It will now be appreciated that after the energization of the relay ZR, as delineated previously, there is no longer a holding circuit for the relay D, both contacts *zr2* and post-spring contacts PS2, now being open and relay D falls back. The release magnet Z, however, is energized as before over the *zr3* contacts, etc. The circuit is ready to receive the fourth digit and is in a slightly different condition from the condition it presented at the conclusion of the receipt of the fourth and fifth digits, respectively; this difference being that the relay D is now released.

*Seventh digit dialled.*—The dialling of the seventh digit "5" will now be traced in detail since the seventh digit is the first of the group of digits which are not to be absorbed by the revertive call-selector circuit and which will actually control the switch selection leading to the completion of the call. As before, the pulsing of the A relay causes the vertical magnet V to be stepped and the wiper assembly is thus raised to the fifth position corresponding to the digit dialled. Previously, the rotary stepping control relay E was operated over the vertical off-normal springs NS3, operated contact *c5*, normal contacts *n5*, *p7*, off-normal contacts CM11 and operated contact *b3*. Relay C releases at the end of the impulse train. Since post springs PS1 have not been cammed at the fifth vertical position, they are now in a position to complete a circuit to the rotary magnet R. The magnet R is energized over operated contact *e2*, post-spring contacts PS1, normal contacts *zr3*, *c5*, *n5*, *p7*, off-normal contact CM11, and operated contact *b3*. The rotary movement of the wiper assembly causes the rotary interrupter contact WR1 to open, thereby opening the circuit for relay E. The release of relay E at contact *e2*, opens the circuit for the rotary stepping magnet R. Thus, the rotary wipers of the switch S are moved to the first contacts of their respective banks. If the first trunk represented by the first contact of the bank CB1 is busy, a ground will be present on the outgoing P lead as is well known by those skilled in the switching art. This ground will be instrumental in causing the E relay to operate via the normal contact *n5*, operated contact *b4*, normal contact CS2, closed contacts WR1 and NS3. Consequently, the reclosure of contact *e2* will cause the stepping magnet R to again energize, moving the contact wipers of switch S to the second contact positions of their respective contact banks. Again, the contact WR1 opens, and relay E is again de-energized. Assuming that the second trunk represented by the second contact in the bank CB1 is idle, no ground will be found on the P wiper and, consequently, the relay E cannot re-operate as before. When relay E released, a shunt was removed from the winding of relay N at contact *e1*. A circuit is thereby completed for the operation of relay N, which is the cut-through relay, via: operated contact *b3*, back off-normal transfer contacts CM11, normal contact *p7*, winding of relay N, normal contact CS2, contacts WR1, NS3, and the winding of relay E. The winding of relay N, however, is of considerably higher resistance than the winding of relay E and, consequently, relay N operates, but relay E remains unoperated. At contacts *n6* and *n7*, a circuit is completed to the minus (−) and plus (+) wipers W2 and W3, of the switch S via: wiper W2, operated contacts *n6*, *a2*, *n7*, upper winding of relay H, rectifier MRA3, to the plus wiper W3. Relay H, the answer-supervisory relay, cannot operate since the rectifier MRA3 is poled in the opposite direction of the current flowing between the wipers W2 and W3. Thus, an outgoing loop is closed and interrupted by the contacts *a2* of relay A, and the pulses derived from such interruptions will actuate further selector switches necessary to complete the connection as in a normal call. Meanwhile at contact *n1*, the circuit for the vertical stepping magnet V is opened and a new path is prepared for the energization of winding II of the relay C. Contact *n4* opens a possible energizing path for the release magnet Z. At operated contact *n5*, a circuit from the P wiper of the switch S, is extended to ground via: normal contact *p7*, back off-normal transfer contact CM11 and make contact *b3*. The application of ground to the P lead thereby busies the succeeding switch to other calls.

*Eighth digit dialled.*—The dialling of the eighth digit "6" causes the relay A to pulse out over the wipers W2 and W3 due to the opening and closure of contact *a2*, it being remembered that transfer contacts *n6* and *n7* are in a position opposite to that shown in the drawing. The N relay also is instrumental in closing a circuit for the operation of digit-counting control relay F via: operated contacts *n2* and *c3*. Relay F is a slow-release relay and holds for a short interval after the release of the C relay at the conclusion of the dialled digit. At operated contact *f5*, a circuit is completed for the energization of stepping magnet OM1, which magnet is the motor for minor switch MS1. The wipers BW1 and BW2 of switch MS1 advance to the first contact positions in their respective banks. The relay F ultimately falls off, since the contact *c3* is open, and the back contact *f3* re-connects the bridging wiper BW1 of switch MS1. However, since the digit last sent is not to be withheld from the outgoing circuit, the first contact of the bank MS11 of the minor switch MS1 is left blank. The function of the minor switch MS1 is to count the digits which are to be sent over the outgoing selector switch S, as distinguished from the digit or digits which are to be withheld from the switch train. If, for example, two digits are to be sent, and a third withheld (corresponding to the conditions assumed in the example delineated herein), the first contact in the contact bank MS11 of the switch MS1 will be left blank and the second contact will be connected by means of the jumper JU to the junction between contacts *p4* and *h2*, as shown. By positioning the jumper to a particular contact on the first bank MS11 of switch MS1, one is enabled to cater for any desired number of digits which are to be sent over the outgoing line prior to the digit which is to be withheld. This facility renders the invention useful in telephone exchanges of any size. Thus, we repeat, that the attachment of the jumper JU to the second contact of bank MS11 of switch MS1, will cause the operation of the P relay at the end of dialling of the ninth digit, in the example given, in a manner which will now be explained.

*Ninth digit dialled.*—The dialling of the ninth digit "7" causes the relay A to pulse as in the previous digits, and again, the outgoing leads, plus and minus, are pulsed by the contact *a2*, as previously explained. The re-energization of relay F again completes a circuit to the stepping magnet OM1 at contact *f5*, thus advancing the minor switch MS1 to its second contact bank position. In this position, a circuit is completed for the operation of digit-recording control relay P via the jumper JU. The relay P will operate via: normal contact *h2*, jumper JU, contact #2, bank MS11 of minor switch MS1, normal contact *f3* and operated contact *n2*. The operation of relay P, however, cannot occur until the end of the dialling of the ninth digit because the relay C maintains an operating circuit for relay F which holds the circuit to relay P open until the end of the digit. Relay P is locked via its holding contact *p4*, and its operated contact *p7* prepares a re-operating circuit for winding I of relay C and at operated contact *p1* opens the circuit to winding II of relay C. At operated contact *p5*, a holding circuit is completed for relay F and at operated contact *p2* a circuit is completed for the stepping magnet OM1. It will be observed that henceforth the stepping magnet OM1 will no longer be controlled by the contact *n2* but will now be in parallel connection to the winding II of relay C and will be pulsed by the *a1* contact via operated contacts *b2* and *c2*. Operated contact *p9*, via normal contact *k2*, effectively shunts the out-pulsing contact *a2* and thus no further outgoing pulses will be sent over the outgoing leads, plus, minus. The operation of relay P at the end of the ninth digit also causes the minor switch MS1 to restore to its normal position by energizing the release magnet ZM(1) via operated contacts *b3*, CM11, *p8*, normal contact *f1* and operated contact CM12. When minor switch OM1 restores to normal, a circuit for winding I of relay C is completed via: operated contact *b3*, normal contact CM11, operated contact *p7* to winding I of relay C. Relay C operates to prepare the pulsing circuit to the OM1 magnet as previously described and to close a circuit to relay F via operated contacts *c3*. Relay F operates and locks via operated contacts *p5* and *f5* to operated contact *n2* and operated contact *f1* prevents the operation of release magnet ZM1 when contacts CM11 and CM12 are driven off-normal by the next series of pulses and the operation of switch MS1.

*Tenth digit dialled.*—The tenth and last digit dialled, "8," is applied by the pulsing contact *a1* to the magnet OM1 via: operated contacts *b2*, *c2* and *p2* and the pulses representing the tenth digit will thus cause the minor switch MS1 to position its wiper BW2 on its bank to record the digit dialled, in this case, bringing the said wiper to contact number 8 in bank MS12.

At this point, the calling subscriber having completed the dialling, should replace his handset on the cradle, thereby opening the subscriber's loop and conditioning it for ringing. However, immediately upon the completion of the dialling of the last digit and upon the release of the C relay, a circuit is completed from the source RBT of Ring-Back Tone via: condenser C1, operated contact *f6*, normal contact *c1* and operated contact *p3*, to signal to the calling subscriber that all of the digits dialled by him have been received. He will thereupon be expected to immediately replace his handset on the cradle. The replacement of the handset in the cradle will cause the A relay to release immediately thereby breaking the energizing circuit of relay B which falls after a time delay. Contact *b5* now open, will remove ground from the incoming P lead thereby permitting the preceding switch train to release in a manner well known to those skilled in the art. The release of the preceding switch train causes the dialled party line to become idle and now a circuit is complete for the operation of answer tone control relay G from ground via: normal contacts *a1*, *b2*, operated contacts *f4*, *p10*, resistor R1, winding of relay G, causing its operation. A circuit is thereby completed for the operation of pulse generating relay K via: normal contact *j5*, operated contact *g1*, normal contact *k1*, resistor R2 to winding I of relay K. The operation of contact *g1* opens a possible operating circuit for the operation of release magnet ZM2, which release magnet is associated with minor switch MS2. Operated contact *g2* prepares an operating circuit for relay J via: normal contact *k3*, and the slip ring of the bank MS21. The operation of relay K causes the energization of stepping magnet OM2, the motor associated with minor switch MS2. Relay K breaks the operating circuit for itself at contact *k1*. Contact *k2* now substitutes for the pulsing contact *a2* and it will transmit an outgoing pulse over the outgoing line via: operated contacts *n6*, *n7* and operated contact *p9*. The time-constant network C2, R2 which is connected to the winding II of relay K, regulates the timed release of relay K. Thus, the relay K will continue to periodically operate and each time that it operates, it steps the minor switch MS2, one step. Due to the inter-strapping between corresponding contacts in bank MS12 of minor switch MS1 and bank MS21 of minor switch MS2, when the wiper BW3 of minor switch MS2 is positioned on a bank contact (contact 8, in the case assumed) which corresponds to the positioning of the wiper BW2 of minor switch MS1, associated with the second bank MS12 thereof, the circuit is completed for pulse gate relay J which will now operate. The operation of relay J at contact *j7* applies a shunt over the outgoing leads, plus, minus, thereby completing a circuit for the operation of relay H and opens the circuit to relay K to prevent further periodic pulsing. The receipt of the last digit of the number by the connector positions its wipers on the terminal of the called station. This terminal is idle as the originating station releases before the last digit is automatically repeated by the revertive call selector. Due to the rectifier MRA3, relay H cannot operate until the polarity of the voltage in the outgoing leads is reversed; this reversal being controlled by a polarity-reversing relay (not shown) in the succeeding connector switch. This operation is well known to those skilled in the art and will not be further explained. This reversal however will not occur until the called party answers. It is assumed in this description that the invention is utilized in a "terminal per station" type of system. Such a system, as is known to those skilled in the art, commonly includes sources of alternating ringing current of four or five different frequencies, each frequency being individual to a different one of the party-line subscribers. In a well-known manner the selection of a particular station on the line simultaneously causes the party line to be seized and the particular ringing frequency to be applied thereto. Any other known method of selectively ringing the wanted party-line subscriber may be employed. The operation of relay H completes a circuit for the energization of its winding II via: operated contacts *h1* and *n2*. At operated contact *h3* a circuit is completed for the application of Ring-Back Tone to the called party via: source RBT, condenser C3, operated contact *h3*, normal contact *d1*, wiper W3. This tone serves to inform the called party that a call is imminent and that he should not replace his handset on the cradle but should await the removal of the handset by the party calling him. It will be understood that the calling party may not remove his handset from the cradle exactly at the moment the called party responds to the call. The operation of relay H also opens the circuit for the relay P at normal contact *h2*. The release of relay P re-applies ground at normal contact *p6* to the P lead via closed contacts NS2. As is well known by those skilled in the art, the ground on the P lead again busies the switch S during the release thereof. The release of relay P also causes the release of relay F at contact *p5* and released relay F opens the circuit to relay G at opened contact *f4*. Due to the delay network C4, R3 in shunt with the winding of relay G releases slowly while maintaining relay J operated at contact $g2$. The ultimate release of relay G opens the circuit for relay J at contact $g2$. The release of relay J breaks the outgoing loop maintained over the wipers W2 and W3 of the switch S at open contact $j7$. This causes the release of the succeeding $n$th selector switch, but since the called party has responded, the connector is not released. The release of the $n$th selector switch causes ground to be removed from the outgoing P lead and the wiper W1, resulting in the release of relay N. Normal contact $j5$ completes an energizing circuit for the operation of the release magnet ZM2 via: normal contact $g1$, closed contacts CM2(1), thereby causing the second minor switch MS2 to restore. The release of relay N thereby opens the holding circuit for the winding II of relay H at contact $n2$. It will now be appreciated that the delay in the release time of relay G caused delay in the release of relay J, thus permitting the tone from source RBT to be applied to the outgoing plus wiper for a period up to the release of relay H. Normal contact $n2$ completes a circuit for the release magnet ZM1 via: off-normal contacts CM1(2). Thus, both minor switches MS1 and MS2 have now restored. The switch S is of the well-known type having a restoring spring which returns the wiper assembly to normal in the rotary direction upon the energization of the release magnet Z, whereupon the assembly drops to normal in the vertical direction. The deenergization of relay J completes a circuit for the energization of the release magnet Z of switch S via: closed contacts NS1, normal contacts $j6$, $n4$, $f4$, $b2$ and $a1$.

The calling party after having waited a reasonable time for the connection to have been completed through to the called party, re-establishes connection with the subscriber's line L and is supplied with talking current by the connector switch which succeeds the revertive call selector.

In the event, however, that the called party does not answer, the relay D will re-operate via front transfer contact $j1$ and break contact $d6$ as a result of the application of "A" pulses applied to terminal ZT3 from the common exchange timer (not shown). The re-operation of relay D applies "B" pulses from the said exchange timer via: terminal ZT2, operated contacts $j8$, $d3$, normal contact $h5$ and winding II of relay H. Relay H will then cause release of the relays D, F, G and J, and ultimately the switch S will restore to normal in the manner previously explained.

The return of the wipers W1 . . . W3 of the switch S to their home position causes the contacts NS1 . . . NS4 to re-assume the position shown in the drawing. Thus, contact NS1 opens the circuit to the reset magnet Z and at open contacts NS2, ground is removed from the incoming P lead, thereby rendering the circuit available for another call by another party-line subscriber seeking to call a co-party line subscriber. The connection between the called and calling subscribers is maintined at the called subscriber's feeding relay which applies the necessary battery to the talking circuit if the connector is arranged for last party release or from the line circuit-feeding relay if 100% lockout is provided and connectors are arranged for calling party release.

If all the outgoing trunks are busy, the selector S will rotate to its eleventh position seeking an ungrounded terminal. However, when the eleventh position is reached, the contacts CS1 apply busy tone to the incoming plus lead, thus advising the calling subscriber that he must await the freeing of a revertive call-selector circuit. Party-line subscribers will know the difference between "busy" tone and "ring-back" tone since they are of different frequencies. The contact CS2 when closed, in the eleventh position of the switch S, as aforesaid, opens the circuit to relay E and thus prevents further rotary stepping since the rotary magnet R depends upon the energization of the relay E, as stated above. The CS2 contacts also place a shunt circuit around the winding of relay N via back contact $n5$ and thereby prevent its operation.

The elements SQA, SQB, are spark-quenching devices of the rectifier type and are well known.

It will be appreciated that there need be but a few of our novel revertive call-selector circuits per exchange since experience shows that the percentage of calls from party-line subscriber to a co-subscriber is not too frequent and that a relatively few of these special circuits will cater to the needs of a medium-size exchange. As stated before, should the calling subscriber find all the outgoing trunks busy, he will receive the busy tone and will thereupon be informed that he should release the connection by replacing his handset. At the conclusion of the call completed by the intervention of the special revertive calling-selector circuit, the final connector will be released and will disconnect the battery from the talking conductors constituting the line L.

*Summary*

The operation of the invention may be summarized as follows:

(1) The special circuit will be seized upon the dialling of the special prefix digital designation.

(2) The selector switch S of the special circuit is made busy and holds the preceding switch operated.

(3) The shaft and wipers of the switch S are raised to the dialled level.

(4) The digits which are not necessary in intra-office communication are absorbed by the release of the switch mechanism.

(5) An idle outgoing trunk is selected.

(6) The special selector circuit is busied to any other dialling subscriber.

(7) The calling subscriber is extended to the succeeding switch when an idle trunk is found.

(8) A predetermined portion of the numerical designation of a called party is passed into the succeeding connector and the balance of the dialled designation of the called party is stored in the revertive call-selector circuit.

(9) Upon the conclusion of the dialling a distinctive tone is transmitted to the calling subscriber to advise him that all the dialled digits have been received and that he should thereupon replace his handset in the cradle.

(10) The special selector circuit is released from the calling party after the calling subscriber disconnects.

(11) The special revertive call-selector switch is held busy until it completes its release.

(12) The stored digital information is sent to the connector and the line is tested for idleness. The called party is signalled by the application of ringing current applied by the connector.

(13) Distinctive tone is applied to the line to advise the called party that a call is imminent from a co-line subscriber and that he should not release the connection.

(14) The answer by the called party causes the complete release of the special revertive call-selector circuit so that it may be seized by other calling subscribers.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A revertive calling circuit in an automatic telephone system comprising a plurality of subscriber stations on a common party line, each station comprising signalling means and having a different numerical directory designation, a selector switch train for routing an outgoing call from said line, means for seizing said circuit by a calling subscriber station in response to an invariable special digital prefix to a directory designation of a called station, signalled by a station on said line, said circuit characterized in that it comprises means for absorbing predetermined digits of said directory designation, means for repeating to said train a portion of the digital representation of said directory designation, means for storing the balance of said digital representation until the freeing of said line by said calling subscriber station and for completing said connection between said calling and said called subscriber stations.

2. In an automatic telecommunication system, a plurality of subscriber stations each having a signalling device, each station coupled to a common party line, each station characterized by a different numerical directory designation, first switch means for detecting a calling subscriber station on said line, a selector switch train for routing an outgoing call from said line, additional selector switch means coupled to said switch train at an intermediate point thereof, means for seizing said additional switch means in response to the signalling by a calling subscriber station of a special digital combination which prefixes the regular directory designation, said special combination characterizing a call from said calling subscriber station to a co-subscriber station on the same party line, said additional switch means characterized in that it comprises digit-absorbing means, digit-transmitting means, digit-storage means, and signalling means, said absorbing means adapted to absorb a predetermined number of digits of the directory designation of said called subscriber station, said transmitting means adapted to transmit to said train a predetermined number of other digits of said directory designation, said storage means adapted to store the remainder of the digital directory designation of said called subscriber station, said signalling means adapted to signal the calling subscriber station upon the conclusion of operation of the signalling device thereat and to re-transmit said stored remainder after release of said line by said calling subscriber station to complete the connection through said train.

3. In an automatic telecommunication system, a plurality of subscriber stations coupled to a common party line, each station comprising a signalling device, each station having a different directory numerical designation, a train of selector switches, a final connector switch, said selector switch train adapted to selectively respond to signals transmitted by a calling station over said common line, additional selector switch means, means for seizing said additional switch means over a switch of said switch train in response to a special signalling digital prefix preceding the regular directory designation of a called station, means in said additional switch means for storing digits representing a predetermined portion of the directory designation of a called station, signal means in said additional switch means for signalling to a calling station the receipt of all transmitted digits representative of said prefix and the directory designation of said called station, means in said additional switch means responsive to the release of said line by said calling station for applying said stored portion to said switch train to complete the connection between said called and said calling stations, means in said additional switch means for testing the condition of said common line, and means responsive to said test for signalling the called station.

4. An automatic telecommunication system as claimed in claim 3, wherein said additional switch means comprises a line relay, a two-motion selector switch having a plurality of cam operated contacts operable in predetermined positions of said switch, digit-absorbing switch means for absorbing predetermined digits signalled by a calling subscriber station, which digits are part of a directory designation of a co-subscriber station on said party line, said digit-absorbing means under the joint control of said line relay and said cam operated contacts.

5. An automatic telecommunication system as claimed in claim 3, wherein said additional switch means comprises pulse train counting means for counting digits sent to said switch train prior to the storing of said predetermined portion of said directory designation.

6. An automatic telecommunication system as claimed in claim 5, wherein said pulse train counting means comprises a selector switch having a plurality of contact banks, one of said banks having a predetermined contact thereof connected to cause operation of said means to store said predetermined portion of said directory designation.

7. An automatic telecommunication system as claimed in claim 6, further comprising a digit-recording control relay having an operating circuit including the predetermined contact of said bank, said last-mentioned relay having contacts for preventing the transmission of impulses over said train.

8. An automatic telecommunication system as claimed in claim 5, further comprising release means for releasing said pulse train counting means, said release means under control of said digit-recording control relay.

9. An automatic telecommunication system as claimed in claim 5, further comprising pulse generating means, pulse repeating means for applying pulses from said generating means to said train, said repeating means under control of said pulse train counting means.

10. An automatic telecommunciation system as claimed in claim 3, wherein said signal means for signalling the receipt of all transmitted digits comprises a source of tone having a characteristic frequency, a digit-counting control relay and a digit-recording control relay, a path under joint control of said two last-mentioned relays interconnecting said tone source with said calling subscriber station.

References Cited in the file of this patent

UNITED STATES PATENTS

| | | |
|---|---|---|
| 2,335,473 | Bakker | Nov. 30, 1943 |
| 2,659,769 | Elliott | Nov. 17, 1953 |
| 2,706,747 | Kessler | Apr. 19, 1955 |
| 2,707,725 | Elliott et al. | May 3, 1955 |
| 2,871,296 | Pharis | Jan. 22, 1959 |